US012619866B2

(12) United States Patent  
Ahuja et al.

(10) Patent No.: US 12,619,866 B2  
(45) Date of Patent: May 5, 2026

(54) METHODS AND APPARATUS TO FACILITATE CONTINUOUS LEARNING

(71) Applicant: Intel Corporation, Santa Clara, CA (US)

(72) Inventors: Nilesh Ahuja, Cupertino, CA (US); Mahesh Subedar, Laveen, AZ (US); Ranganath Krishnan, Hillsboro, OR (US); Ibrahima Ndiour, Portland, OR (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 17/132,858

(22) Filed: Dec. 23, 2020

(65) Prior Publication Data

US 2021/0117792 A1     Apr. 22, 2021

(51) Int. Cl.  
*G06N 3/08* (2023.01)  
*G06F 7/58* (2006.01)  
*G06N 3/045* (2023.01)  
*G06N 3/047* (2023.01)

(52) U.S. Cl.  
CPC .............. *G06N 3/08* (2013.01); *G06F 7/582* (2013.01); *G06N 3/045* (2023.01); *G06N 3/047* (2023.01)

(58) Field of Classification Search  
None  
See application file for complete search history.

(56) References Cited

U.S. PATENT DOCUMENTS

| | | | |
|---|---|---|---|
| 2016/0034811 A1* | 2/2016 | Paulik | G06N 3/045 |
| | | | 706/20 |
| 2019/0012592 A1* | 1/2019 | Beser | G06N 3/063 |
| 2019/0042913 A1* | 2/2019 | Knag | G06N 3/04 |
| 2020/0143171 A1* | 5/2020 | Lee | G06V 20/49 |

(Continued)

FOREIGN PATENT DOCUMENTS

| | | |
|---|---|---|
| CN | 111898764 A | 11/2020 |
| TW | 202044128 A | 12/2020 |

OTHER PUBLICATIONS

Goodfellow et al., "Deep Learning," The MIT Press, 2016, pp. 305-307, Published online Oct. 29, 2017, 3 pages.

(Continued)

*Primary Examiner* — Andrew J Jung  
(74) *Attorney, Agent, or Firm* — Hanley, Flight & Zimmerman, LLC

(57) ABSTRACT

Methods, apparatus, systems and articles of manufacture are disclosed to facilitate continuous learning. An example apparatus includes a trainer to train a first Bayesian neural network (BNN) and a second BNN, the first BNN associated with a first weight distribution and the second BNN associated with a second weight distribution. The example apparatus includes a weight determiner to determine a first sampling weight associated with the first BNN and a second sampling weight associated with the second BNN. The example apparatus includes a network sampler to sample at least one of the first weight distribution or the second weight distribution based on a pseudo-random number, the first sampling weight, and the second sampling weight. The example apparatus includes an inference controller to generate an ensemble weight distribution based on the sample.

19 Claims, 7 Drawing Sheets

(56) References Cited

U.S. PATENT DOCUMENTS

| | | | | |
|---|---|---|---|---|
| 2020/0334579 | A1* | 10/2020 | Aguilar-Simon | ............................ G06V 10/7788 |
| 2020/0364567 | A1* | 11/2020 | Oh | ........................ G06N 3/0464 |
| 2020/0410364 | A1* | 12/2020 | Willers | .................. G06N 3/045 |
| 2021/0034947 | A1* | 2/2021 | Wang | ..................... G06N 3/065 |
| 2021/0073631 | A1* | 3/2021 | Kadayam Viswanathan | ............... G06F 18/24155 |
| 2021/0089878 | A1* | 3/2021 | Greenewald | ........... G06N 3/047 |
| 2021/0110264 | A1 | 4/2021 | Macias et al. | |
| 2021/0117792 | A1 | 4/2021 | Ahuja | |
| 2021/0350218 | A1* | 11/2021 | Dalgaty | ................. G06N 3/047 |
| 2021/0374500 | A1* | 12/2021 | Ghosh | .................... G06N 20/20 |
| 2023/0116117 | A1 | 4/2023 | Shao | |

OTHER PUBLICATIONS

Fort et al., "Deep Ensembles: A Loss Landscape Perspective," Jun. 25, 2020, [http://arxiv.org/abs/1912.02757], 15 pages.

Pearce et al., "Bayesian Neural Network Ensembles," Nov. 27, 2018, Montreal, Canada, [http://arxiv.org/abs/1811.12188], 5 pages.

Kirkpatrick et al., "Overcoming catastrophic forgetting in neural networks," Mar. 28, 2017, vol. 114, No. 3, pp. 3521-3526, [www.pnas.org/cgi/doi/10.1073/pnas.1611835114], 6 pages.

Nguyen et al., "Variational Continual Learning," ICLR, May 20, 2018, [http://arxiv.org/abs/1710.10628], 18 pages.

Rebuffi et al., "iCaRL: Incremental Classifier and Representation Learning," Apr. 14, 2017, [http://arxiv.org/abs/1611.07725], 15 pages.

Smith et al., "Understanding Measures of Uncertainty for Adversarial Example Detection," Mar. 22, 2018, 10 pages.

Foong et al., "Pathologies of Factorised Gaussian and MC Dropout Posteriors in Bayesian Neural Networks," Sep. 2, 2019, [https://www.researchgate.net/publication/335599363], 17 pages.

Blundell et al., "Weight Uncertainty in Neural Networks," International Conference on Machine Learning, May 21, 2015, 10 pages.

Gal et al., "Dropout as a Bayesian Approximation: Representing Model Uncertainty in Deep Learning," Proceedings of the 33rd International Conference on Machine Learning, Oct. 4, 2016, 12 pages.

Kendall et al., "What Uncertainties Do We Need in Bayesian Deep Learning for Computer Vision?" Oct. 5, 2017, 31st Conference on Neural Information Processing Systems, [https://arxiv.org/abs/1703.04977], pp. 5574-5584, 12 pages.

Intel, "Intel Math Kernel Library," [https://software.intel.com/content/www/us/en/develop/documentation/mkl-vsnotes/top/testing-of-distribution-random-number-generators/continuous-distribution-random-number-generators.html], Jun. 23, 2020, 120 pages.

Taiwan Intellectual Property Office, "Preliminary review and approval," issued in connection with Taiwanese Patent Application No. 110134397, dated Jul. 16, 2025, 4 pages. [Machine English Translation Included].

Taiwan Intellectual Property Office, "Initial Review Opinion Notification Letter and Search Report" issued in connection with Taiwanese Patent Application No. 110134397, dated Mar. 5, 2025, 30 pages. [English Machine Translation Included].

* cited by examiner

100

400

$W_1 \sim N(u_1, \Sigma_1)$

406

BNN 1 — 402

$W \sim \sum_{i=1}^{N} N(u_i, \Sigma_i)$ — 410

$W_N \sim N(u_N, \Sigma_N)$

408

BNN N — 404

500

0 ⊢ $a_1$ ┤ $a_2$ ⊢ $a_3$ ⊢ ... ⊢ $a_N$ ⊣ 1

502
504
506
508

METHODS AND APPARATUS TO FACILITATE CONTINUOUS LEARNING

FIELD OF THE DISCLOSURE

This disclosure relates generally to neural networks, and, more particularly, to methods and apparatus to facilitate efficient knowledge sharing among neural networks.

BACKGROUND

In recent years, machine learning and/or artificial intelligence have increased in popularity. For example, machine learning and/or artificial intelligence may be implemented using neural networks. Neural networks are computing systems inspired by the neural networks of human brains. A neural network can receive an input and generate an output. The neural network can be trained (e.g., can learn) based on feedback so that the output corresponds to a desired result. Once trained, the neural network can make decisions to generate an output based on any input. Neural networks are used for the emerging fields of artificial intelligence and/or machine learning. A Bayesian neural network is a particular type of neural network that includes neurons that output a variable weight as opposed to a fixed weight. The variable weight falls within a probability distribution defined by a mean value and a variance determined during training of the Bayesian neural network.

BRIEF DESCRIPTION OF THE DRAWINGS

The figures are not to scale. In general, the same reference numbers will be used throughout the drawing(s) and accompanying written description to refer to the same or like parts.

Figure 1:
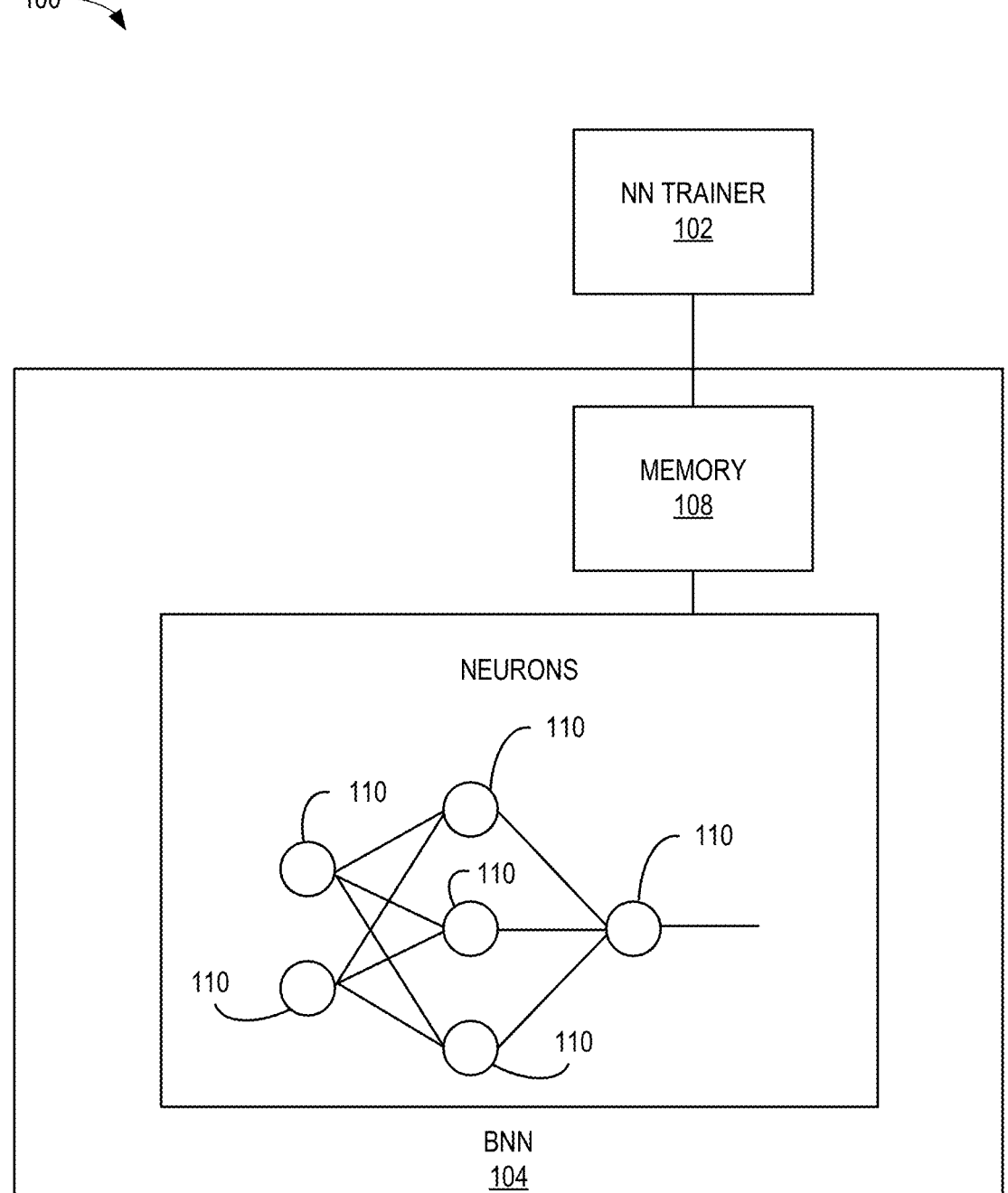
FIG. 1 is a schematic illustration of an example Bayesian neural network.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Ideally, deep neural networks (DNNs) deployed in real-world tasks should be able to recognize atypical inputs (e.g., inputs that would be considered out-of-distribution, anomalies, novel, etc.) to determine whether to ignore the inputs (e.g., because they are not relevant to the task) or learn from them. That is, DNNs perform out-of-distribution (OOD) detection and continuous learning on new inputs. However, prior DNNs are not suited for OOD detection and continuous learning. For example, when trying to identify OOD inputs, DNNs tend to give incorrect yet overconfident outcomes. Further, when trying to learn from new inputs by updating the weights, DNNs rapidly forget their old data. That is, DNNs experience catastrophic forgetting when learning from new inputs.

In some examples, DNNs are not suited for OOD detection and continuous learning because the weights and parameters of DNNs are represented by single point estimates. Therefore, a single set of trained network weights do not capture the model uncertainty (e.g., the epistemic uncertainty) due to the lack of complete knowledge of the network's weights. Further, any deviation from this single set of weights results in network performance degradation on the previous training data (e.g., leading to catastrophic forgetting in continuous learning scenarios). Thus, a set of trained weights associated with a probability distribution can be marginalized during inference and better represent the complete knowledge of the network's weights. Prior techniques, including BNNs and ensembles of non-Bayesian DNNs, are limited in their ability to represent the complete weight distribution.

Bayesian Neural Networks (BNNs) are machine learning neural networks capable of computing an epistemic uncertainty (e.g., systemic uncertainty) and an aleatoric uncertainty (e.g., statistical uncertainty) at inference. For example, a system (e.g., a computing system) may include at least one or more agents (e.g., computing devices, computing processors, computing systems, etc.) operating under different environments, learning independently using BNNs. In such a system, there may exist a data set including a first subset of data and a second subset of data. Further, in such a system there may exist a first BNN operating on a first computing device in a first computing environment trained using the first subset of data. Similarly, there may exist a second BNN operating on a second computing device in a second computing environment trained using the second subset set of data. Accordingly, it may not be computationally efficient or feasible to share the training knowledge among the first BNN and the second BNN so that either the first BNN or the second BNN can perform inference accurately on the data set (e.g., both the first subset of data and the second subset of data).

In some examples, variational inference methods are proposed to achieve tractable inference because inferring the true posterior in BNNs is analytically intractable. Variational inference methods (e.g., mean field variational inference (MFVI), Monte-Carlo dropout (MC dropout), etc.) tend to fit an approximation to a local mode and do not capture the full posterior, causing them to be overconfident for data that is in-between regions of observations. Further, scaling variational inference to BNNs with A multimodal posterior is challenging.

Ensemble approaches have been explored in the context of deterministic neural networks in which all members of the ensemble share the same network topology but different sets of weights and parameters. In some examples, the network parameters are obtained using techniques such as bagging and boosting, which involves training the set with multiple random initializations. In some examples, the parameters of the ensemble are obtained by randomized sampling and regularization to provide a consistent estimator of the Bayesian posterior. In such examples, the local measure of uncertainty is the Softmax probability, which is often unreliable (e.g., only the global level of the ensemble can obtain a robust uncertainty estimate). In some examples, an ensemble of MC dropout models is used for adversarial example detection. However, MC dropout is a crude approximation of Bayesian inference.

As described above, in continuous learning, the parameters of a network are updated when new and previously unseen data is encountered. However, previous techniques experience catastrophic forgetting. For example, previous techniques for continuous learning focus on updating parameters of a single network rather than maintaining an ensemble of models. In some examples, non-Bayesian techniques, Bayesian techniques, and/or other techniques that store old data samples seek to mitigate catastrophic forgetting. For example, some previous techniques retain samples of old training data, which is replayed to the network when training with new data. Such examples are associated with a high computing cost (e.g., computing time, memory requirements, etc.) due to the size of the dataset increasing each time new data is observed.

Examples disclosed herein implement an ensemble of BNNs, enabling the determination of a more complete representation of the distribution of weights. For example, an ensemble of BNNs can obtain uncertainty estimates that are relatively more robust than previous techniques (e.g., a BNN, an ensemble of DNNs, etc.), which can be used for various applications such as identification of OOD inputs, anomalous inputs, shifts in data distribution, continuous learning, etc. In examples disclosed herein, weights of BNNs are modeled with parametric distributions. Thus, because each member of the ensemble is a BNN, the BNN can provide its own estimate of uncertainty, which can then be mixed with uncertainty estimates from other BNNs of the ensemble. Thus, there is both a robust local view of uncertainty (e.g., per model) and a robust global view (e.g., for the ensemble).

In examples disclosed herein, the posterior distribution of the weights for each individual network is modeled as a unimodal Gaussian. Thus, the ensemble is equivalent to modeling the weight posterior with a Gaussian Mixture Model (GMM). A GMM is a universal approximator of probability densities. Thus, the ensemble of BNNs enables a more complete representation of the distribution of weights, resulting in more robust and accurate uncertainties during inference. For example, the ensemble of BNNs can identify novel, atypical, and/or previously unseen inputs. In some examples, the members of the ensemble can be trained by the full dataset (if available) or with partially available datasets (e.g., subsets). For example, each member of the ensemble can be trained with and/or specialize on a subset of the data. Thus, the resulting ensemble represents the combined knowledge of the BNNs. Additionally or alternatively, examples disclosed herein are well suited for distributed deployment (e.g., federated-learning applications) wherein each member in the ensemble is trained with data that is only locally available. In examples disclosed herein, inference is performed using MC-sampling techniques from the weight distributions of the ensemble members. That is, examples disclosed herein combine the knowledge implicit in each dataset and the outcome represents the combined knowledge contained in the ensemble.

FIG. 1 is a schematic illustration of an example neural network (NN) system 100. In some examples, the NN trainer 102 implements means for training neural networks. The example NN system 100 includes an example NN trainer 102 to train example BNN 104. The example BNN 104 includes an example memory 108, and example neurons 110. Although the illustrated neurons 110 of FIG. 1 include six neurons, there may be any number of neurons in any type of configuration.

The example NN trainer 102 of FIG. 1 trains the BNN 104 by selecting a mean weight and an amount of deviation for the mean weight for each of the neurons 110. Initially, the BNN 104 is untrained (e.g., the neurons are not yet weighted with a mean and deviation). To train the BNN 104, the example NN trainer 102 of FIG. 1 uses training data (e.g., input data labelled with known classifications and/or outputs) to configure the BNN 104 to be able to predict output classifications for input data with unknown classification. The NN trainer 102 may train a model with a first set of training data and test the model with a second set of the training data. If, based on the results of the testing, the accuracy of the model is below a threshold, the NN trainer 102 can tune (e.g., adjust, further train, etc.) the parameters of the model using additional sets of the training data and continue testing until the accuracy is above the threshold. After the NN trainer 102 has trained the BNN 104, the example NN trainer 102 stores the corresponding means and deviations for the respective neurons 110 in the example memory 108 of the example BNN 104. The example NN trainer 102 may be implemented in the same device as the BNN 104 and/or in a separate device in communication with the example BNN 104. For example, the NN trainer 102 may be located remotely, develop the weight data locally, and deploy the weight data (e.g., means and deviation for the respective neurons 110) to the BNN 104 for implementation.

The example BNN 104 of FIG. 1 further includes the example memory 108. The example memory 108 stores the weight data from the example NN trainer 102 in conjunction with a particular neuron. For example, a first section of the memory 108 is dedicated for a first mean value and a first variance value for a first neuron, a second section of the memory 108 is dedicated to a second mean value and a second variance value for a second neuron, etc. The mean value may be stored in the dedicated section as a bit value representative of the mean value.

The example neurons 110 of FIG. 1 receive input data, generate a weight that corresponds to a probability distribution and applies the weight to the input data to generate an output. For example, if the probability distribution of a neuron follows a standard normal distribution, the mean weight of the neuron is 0.7, and the variance of the neuron is 0.01 (e.g., the standard deviation is 0.1), then the will be a 68% chance that the neuron will output a weight between 0.6 and 0.8 (e.g., one standard deviation away from the mean), a 95% chance that the neuron will output a weight between 0.5 and 0.9 (e.g., two standard deviations away from the mean), etc. Accordingly, the weight generated by the output may be different every time a weight is generated but will follow the probability distribution.

Figure 2:
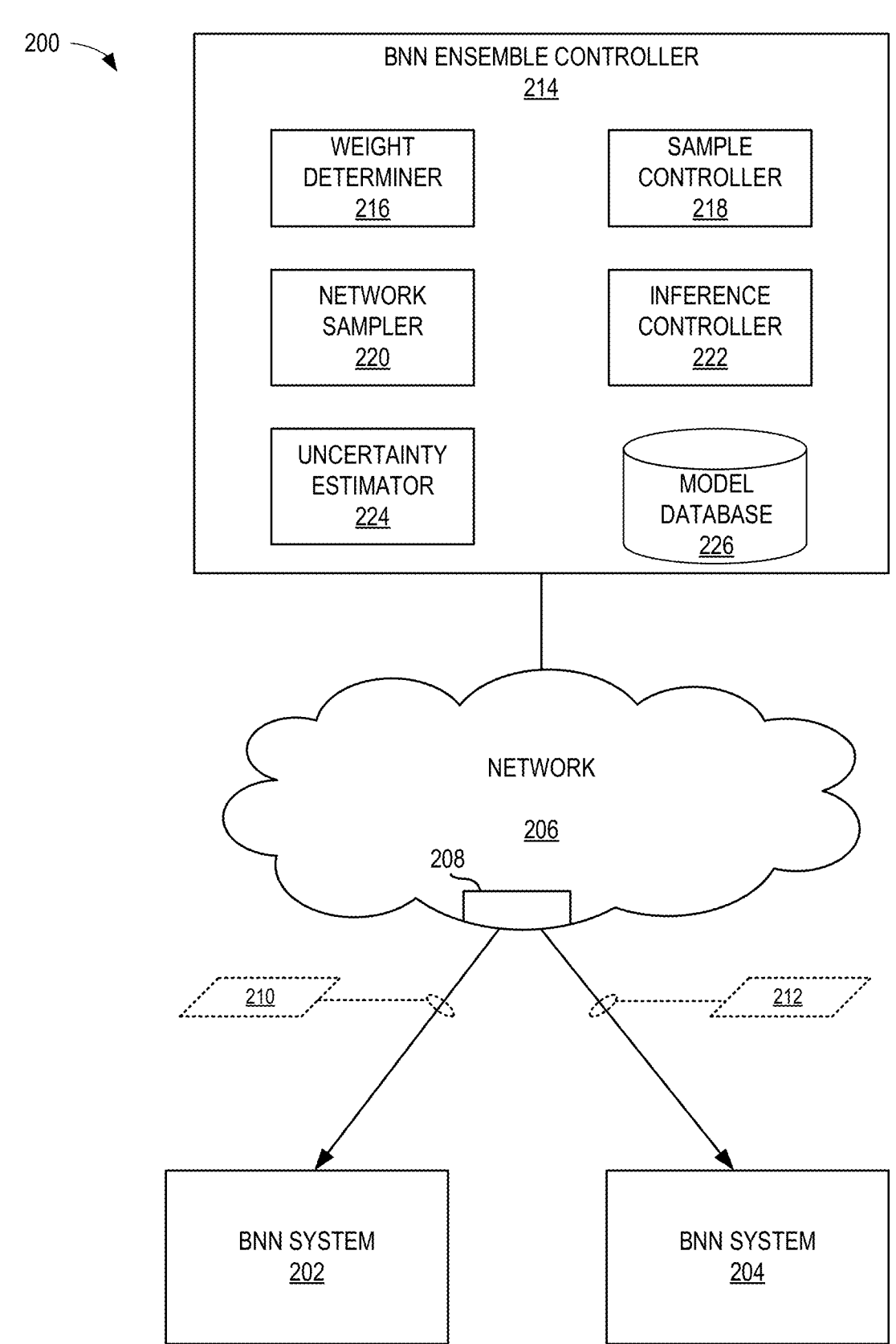
FIG. 2 is a schematic illustration of an example environment including an example first BNN system, an example second BNN system, and an example BNN ensemble controller to facilitate continuous learning in accordance with teachings of this disclosure.

FIG. 2 illustrates an example environment 200 including an example first BNN system 202, an example second BNN system 204, and an example BNN ensemble controller 214. In the example of FIG. 2, the first BNN system 202 and/or the second BNN system 204 may implement the example BNN 104 and/or the NN trainer 102 of FIG. 1. For example, the first BNN system 202 may implement the NN trainer 102 and the BNN 104 of FIG. 1. Likewise, the second BNN system 204 may implement the NN trainer 102 and the BNN 104 of FIG. 1, in an execution space separate from the first BNN system 202.

In the example environment 200 of FIG. 2, the first BNN system 202 and the second BNN system 204 communicate with an example network 206. In FIG. 2, the network 206 is a wireless network (e.g., a cloud network) configured to communicate with the first BNN system 202 and the second BNN system 204. In other examples disclosed herein, the network 206 may be implemented using any suitable wired and/or wireless network.

The network 206 further stores an example dataset 208. Such a dataset 208 includes an example first subset of data 210 and an example second subset of data 212. In operation, the network 206 transmits the first subset of data 210 to the first BNN system 202. The network 206 further transmits the second subset of data 212 to the second BNN system 204.

In the example of FIG. 2, the network 206 transmits the first subset of data 210 to the first BNN system 202 for use by the first BNN system 202 in training. Likewise, the network 206 transmits the second subset of data 212 to the second BNN system 204 for use in training. In examples disclosed herein, the first subset of data 210, the second subset of data 212, and/or more generally, the dataset 208 may correspond to any data suitable for training a BNN system (e.g., the first BNN system 202 and/or the second BNN system 204). For example, the first subset of data 210, the second subset of data 212, and/or more generally, the dataset 208 may correspond to a set of data for use in learning a policy (e.g., intent prediction, collision avoidance, etc.).

In some examples, the first subset of data 210 and the second subset of data 212 are the same. For example, the first subset of data 210 and the second subset of data 212 are the dataset 208. That is, the members of the ensemble (e.g., the first BNN system 202 and the second BNN system 204) have access to the full training dataset. In such examples, the NN trainer 102 trains the BNN of the first BNN system 202 and the BNN of the second BNN system 204 with different random initializations. Collectively, the first BNN system 202 and the second BNN system 204 provide a more complete representation of the distribution of the weights than the first BNN system 202 and/or the second BNN system 204, respectively. Similarly, the ensemble of BNNs obtain better uncertainty estimates than the BNN systems 202, 204 on their own.

Additionally or alternatively, the first subset of data 210 can be different than the second subset of data 212. For example, the members of the BNN ensemble have access to only a subset of the training data (e.g., the dataset 208). In some examples of distributed applications, the networks of the BNN ensemble have a partial view of the training data. For example, the dataset 208 can correspond to images collected in a forest. A first camera positioned in a first part of a forest can generate the first subset of data 210 and a second camera positioned in a second part of the forest can generate the second subset of data 212. In some examples, the first subset of data 210 and the second subset of data 212 are mutually exclusive.

Additionally or alternatively, the first subset of data 210 and the second subset of data 212 can correspond to classes of data. For example, the first BNN system 202 specializes on a first class of data (e.g., the first subset of data 210) and the second BNN system 204 specializes on a second class of data (e.g., the second subset of data 212). For example, the first BNN system 202 specializes on recognizing felines (e.g., lions, tigers, jaguars, etc.) and the second BNN system 204 specializes on recognizing canines (e.g., wolves, foxes, jackals, etc.). Thus, the BNNs of the ensemble (e.g., the first BNN system 202 and the second BNN system 204) specialize in a task and enable multi-task learning.

While the illustrated example of FIG. 2 includes two BNN systems, examples disclosed herein can include any number of BNN systems. That is, examples disclosed herein are scalable. For example, an additional BNN system can be added to the ensemble without disturbing the existing BNN systems. In some examples, an additional BNN system is added to the ensemble in response to obtaining additional input data (e.g., enabling continuous learning). Likewise, if a particular network obtains new data, the weights of the network can be updated to learn the new data without affecting the weights of the other networks of the ensemble. Thus, new data is learnt without impacting the previous learnt data in the remaining networks, thereby minimizing catastrophic forgetting.

The example BNN ensemble controller 214 trains an ensemble of BNNs for identification of OOD inputs, anomalous inputs, shifts in data distribution, continuous learning, etc. In some examples, the weight distributions of the first BNN system 202 and the second BNN system 204 are unimodal Gaussian, and thus, the ensemble of BNNs is equivalent to modeling with a GMM. Because a GMM is a universal approximator of probability densities, the BNN ensemble enables a more complete representation of the distribution of weights. The predictive distribution at the output of the BNNs is represented in example Equation 1.

$$p(y \mid x, D) = \int p(y \mid x, w)p(w \mid D)dw \approx \frac{1}{M}\sum_{i=1}^{M}p(y \mid x, w_i) \qquad \text{Equation 1}$$

In example Equation 1, x is the input sample, y is the output, D is the training dataset (e.g., the subsets of data 210, 212), and p(w|D) is the posterior over the weights learnt from the training dataset. Thus, the quality of the representation of the weight-posterior directly impacts the quality of the predictive distribution obtained at the output.

In some examples, the BNN ensemble controller 214 performs inference using MC-sampling from the weight distributions of the BNNs (e.g., the BNN systems 202, 204). For example, a Gaussian mixture model is represented by example Equation 2.

$$g(x) = \sum_{i=1}^{N}\alpha_i N(\mu_i, \Sigma_i), \text{ such that } \sum \alpha_i = 1 \qquad \text{Equation 2}$$

In example Equation 2, $\alpha_i$ is the weight of the $i^{th}$ component (e.g., the $i^{th}$ BNN system) and $N(\mu_i, \Sigma_i)$ is the weight distribution of the $i^{th}$ component.

In the illustrated example of FIG. 2, the BNN ensemble controller 214 includes an example weight determiner 216, an example sample controller 218, an example network sampler 220, an example inference controller 222, an example uncertainty estimator 224, and an example model database 226.

The example weight determiner 216 determines a sampling weight of the BNN systems of the ensemble. That is, the weight determiner 216 determines $\alpha_i$ for the BNN systems (e.g., the first BNN system 202 and/or the second BNN system 204). In some examples, the weight determiner 216 implements means for determining weights. The example weight determiner 216 determines a proportion, $\beta_j$, of the samples of a class j in the training set, D. In examples disclosed herein, $\Sigma\beta_j=1$. The example weight determiner 216 determines the number of networks, $N_j$, in the ensemble that include the class j. For example, if the class j is felines and the first subset of data 210 includes images of felines but the second subset of data 212 does not, the weight determiner 216 determines one network recognizes the feline class. The example weight determiner 216 determines a set of class labels, $L_j$, that have been assigned to the network i. The example weight determiner 216 determines the value of $\alpha_i$ based on example Equation 3.

$$\alpha_i = \sum_{j \in L_i} \frac{\beta_j}{N_j} \qquad \text{Equation 3}$$

For example, if each network of the BNN ensemble was trained with all of the training data (e.g., the dataset 208), the weight determiner 216 determines, for each class j, all of the networks of the BNN have observed the class j (e.g., $N_j=N$, $\forall j$). In such examples, the weight determiner 216 determines the sampling weight of each BNN of the ensemble is $$\frac{1}{N}\left(\text{e.g., } \alpha_i = \frac{1}{N}\sum_j \beta_j = \frac{1}{N}\right).$$

Additionally or alternatively, if each network was trained with one class, the weight determiner 216 determines the sampling weight of each BNN of the ensemble is $\beta_i$ (e.g., $\alpha_i=\beta_i$).

The example sample controller 218 determines the number of samples, N, to collect from the BNN ensemble. In some examples, the sample controller 218 implements means for determining a number of samples to collect. In some examples, the sample controller 218 determines the number of samples based on performance constraints and/or the quality of uncertainty. That is, the sample controller 218 determines the number of samples based on compute requirements, latency requirements, and/or memory requirements of the applications. For example, increasing the number of samples increases the computing time and power consumption to produce an output. Thus, the sample controller 218 determines the number of samples to collect based on a power budget and throughput requirements. Additionally or alternatively, the sample controller 218 determines the number of samples to collect based on a quality of uncertainty. That is, a greater number of samples produces a better quality of the predictive distribution at the output. For example, the sample controller 218 determines the number of samples based on a sampling threshold (e.g., whether a threshold number of samples has been exceeded)

and/or an uncertainty threshold (e.g., whether a threshold uncertainty has been satisfied).

The example network sampler 220 samples the ensemble of BNNs. In some examples, the network sampler 220 implements means for sampling neural networks. In some examples, the network sampler 220 samples a multinomial distribution partitioned based on the parameters $\{\alpha_i\}$. That is, the network sampler 220 partitions the interval [0,1] into N intervals of length $$\{a_i\}_{i=1}^N.$$

The interval [0,1] is partitioned into k number of components. In examples disclosed herein, the network sampler 220 determines a pseudo-random number. In some examples, the network sampler 220 is implemented by an Intel® Digital Random Number Generator (DRNG) to determine a number between 0 and 1. However, the network sampler 220 may implement any other suitable pseudo-random number generator. The network sampler 220 samples the Normal distribution, $N(\mu_k, \Sigma_k)$, of the $k^{th}$ component (e.g., BNN) corresponding to the pseudo-random number.

The example inference controller 222 aggregates the samples to determine a predictive distribution. In some examples, the inference controller 222 implements means for inferring. For example, the inference controller 222 uses a GMM to mix the samples of the weight distributions of the BNN ensemble. In some examples, the inference controller 222 generates a Gaussian distribution from a uniform distribution using an Intel® Math Kernel Library (MKL), etc. However, the inference controller 222 may implement any other suitable library. In some examples, the inference controller 222 stores the predictive distribution in the model database 226.

The example uncertainty estimator 224 determines uncertainties of the predictive distribution to detect OOD data and/or anomalous data. In some examples, the uncertainty estimator 224 implements means for estimating uncertainty. For example, the uncertainty estimator 224 determines an aleatoric uncertainty (e.g., noise inherent in the observations) and/or an epistemic uncertainty (e.g., uncertainty in the model parameters) of the predictive distribution. In some examples, the uncertainty estimator 224 determines the epistemic uncertainty of the predictive distribution over the outputs using predictive variance. The uncertainty estimator 224 identifies and flags OOD data in response to the epistemic uncertainty exceeding an uncertainty threshold. That is, OOD data has a relatively higher epistemic uncertainty with respect to in-distribution data. In some examples, the uncertainty estimator 224 determines the uncertainty threshold based on uncertainty values of known in-distribution data samples (e.g., training data). That is, the uncertainty estimator 224 determines a range of uncertainty values for in-distribution data samples. Thus, the uncertainty estimator 224 flags data with uncertainty values outside of the range as OOD data. In some examples, the BNN ensemble controller 214 discards the input data that is flagged as OOD data. That is, the BNN ensemble controller 214 identifies the OOD data as unrelated to the BNN ensemble and determines to not learn from the OOD data.

The example model database 226 stores the predictive distribution. For example, the model database 226 stores the predictive distribution generated by the example inference controller 222. The example model database 226 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example model database 226 may be in any data format such as, for example, binary data, comma delimited data, tab delimited data, structured query language (SQL) structures, etc. While, in the illustrated example, the model database 226 is illustrated as a single device, the example model database 226 and/or any other data storage devices described herein may be implemented by any number and/or type(s) of memories.

Figure 3:
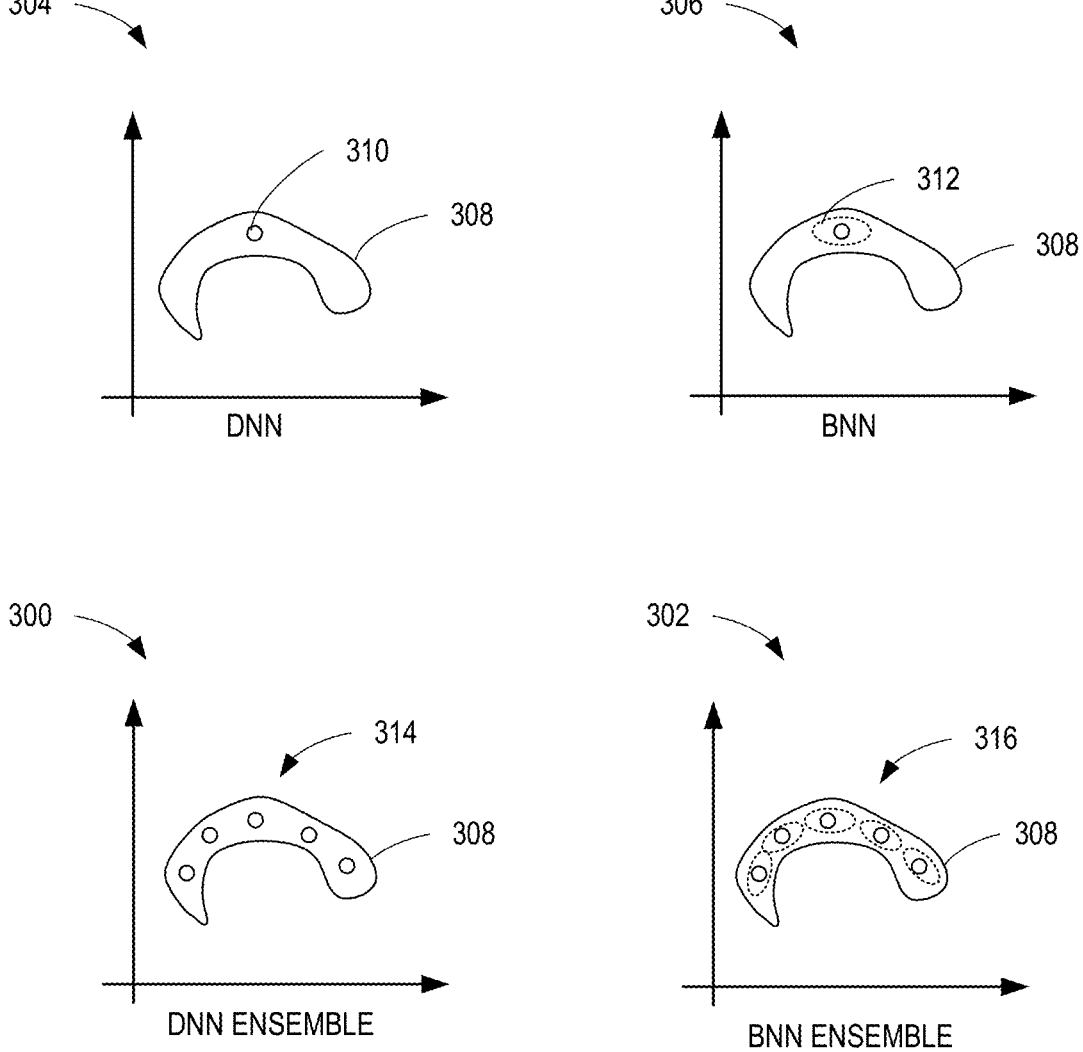
FIG. 3 is an example illustration of two-dimensional weight space.

FIG. 3 is an example illustration of two-dimensional (2D) weight space. The illustrated example of FIG. 3 includes an example DNN weight distribution 300, an example BNN weight distribution 302, an example DNN ensemble weight distribution 304, and an example BNN ensemble weight distribution 306. The example weight distributions 300, 302, 304, 306 include an example optimal weight distribution 308. The example DNN weight distribution 300 includes an example point 310. In some examples, the example point 310 does not provide a good representation of the optimal weight distribution 308.

The weight distributions of the BNN weight distribution 302 and the DNN ensemble weight distribution 304 provide a better estimation of the optimal weight distribution 308 with respect to the DNN weight distribution 300. For example, the BNN weight distribution 302 includes an example Gaussian distribution 312. That is, the Gaussian distribution 312 is associated with a mean and standard deviation, resulting in a unimodal multivariate Gaussian in the 2D weight space. The example DNN ensemble weight distribution 304 includes example points 314. In the illustrated example of FIG. 3, the points 314 include five points representing a set of samples taken from the optimal weight distribution 308. However, there are large gaps between the points 314. Thus, an adequate representation of the optimal weight distribution 308 based on the DNN ensemble weight distribution 304 can require several samples, increasing the computing time.

The example BNN ensemble weight distribution 306 includes example Gaussian distributions 316. For example, the Gaussian distributions 316 include five Gaussian distributions associated with means and standard deviations. In the illustrated example of FIG. 3, the Gaussian distributions 316 have smaller gaps between the ones of the Gaussian distributions 316 with respect to the points 314 of the DNN ensemble weight distribution 304. Thus, the Gaussian distributions 316 represent the optimal weight distribution 308 relatively better than the example points 314.

Figure 4:
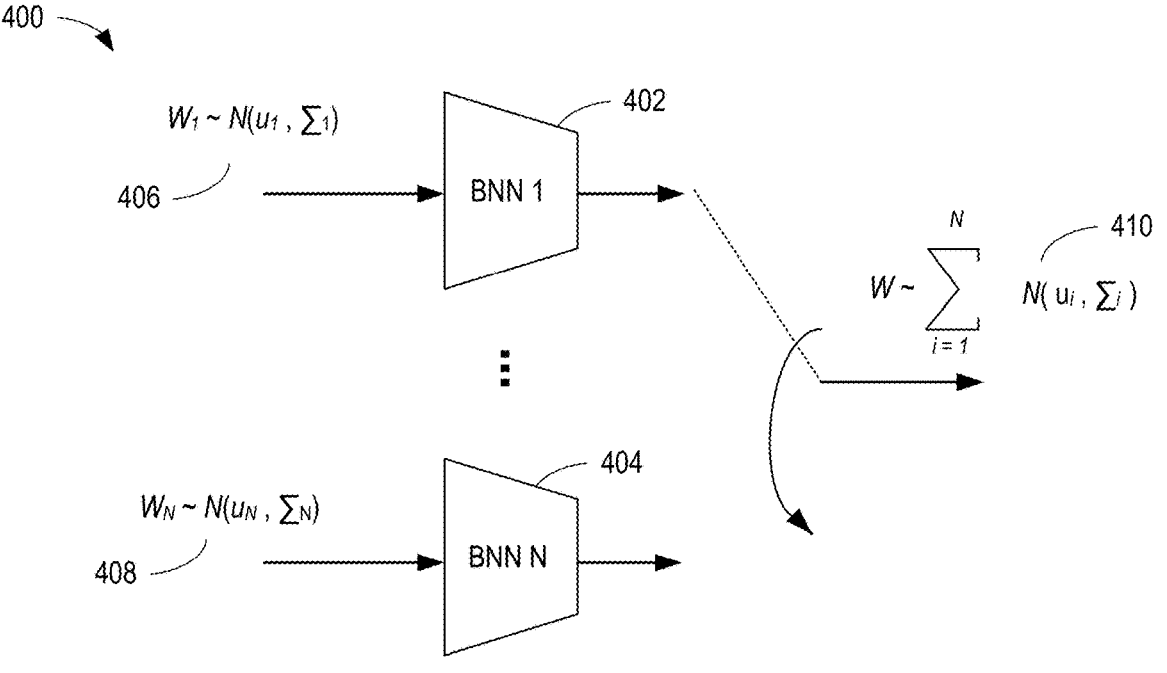
FIG. 4 is a schematic illustration of an example BNN ensemble system for continuous learning.

FIG. 4 is a schematic illustration of an example BNN ensemble system 400 for continuous learning. The example BNN ensemble system 400 includes an example first BNN 402 and an example second BNN 404. However, the example BNN ensemble system 400 can include any number of BNNs. For example, the BNN ensemble system 400 can include N number of BNNs (e.g., the second BNN 404 is the $N^{th}$ BNN). The first BNN 402 is associated with an example first weight distribution 406 and the second BNN 404 is associated with an example second weight distribution 408. For example, the NN trainer 102 (FIG. 1) trains the first BNN 402 on a first subset of data to generate the first weight distribution 406 and the NN trainer 102 trains the second BNN 404 on a second subset of data to generate the second weight distribution 408.

The example BNN ensemble system 400 includes an example third weight distribution 410. In examples disclosed herein, the third weight distribution 410 is based on the first weight distribution 406 and the second weight distribution 408. In some examples, the third weight distribution 410 is a predictive distribution. For example, the BNN ensemble controller 214 (FIG. 2) samples and mixes the weight distributions 406, 408 to generate the third weight distribution 410.

Figure 5:
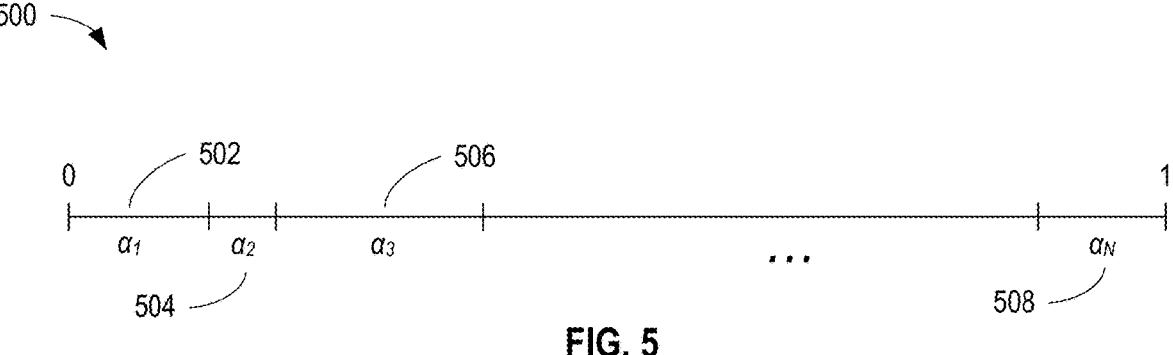
FIG. 5 is an example illustration of weighted parameters.

FIG. 5 is an example illustration of weighted parameters 500. The weighted parameters 500 include an example first weighted parameter 502, an example second weighted parameter 504, an example third weighted parameter 506, and an example fourth weighted parameter 508. In examples disclosed herein, the weighted parameters 502, 504, 506, 508 correspond to sampling weights (e.g., $\alpha$). For example, the weighted parameters 500 correspond to BNNs (e.g., the first weighted parameter 502 corresponds to a first BNN, the second weighted parameter 504 corresponds to a second BNN, etc.). In examples disclosed herein, the weight determiner 216 (FIG. 2) determines the values of the weighted parameters 502, 504, 506, 508 using example Equation 3.

The example BNN ensemble controller 214 (FIG. 2) uses the weighted parameters 500 to sample an ensemble of BNNs to generate a mixed weight distribution. For example, the network sampler 220 determines a pseudo-random number between 0 and 1, which identifies a $k^{th}$ component of the weighted parameters 500. The network sampler 220 samples the weight distribution of the BNN corresponding to the selected $k^{th}$ component. In examples disclosed herein, the weighted parameters 500 determine the probability a BNN of the ensemble is sampled. For example, the first weighted parameter 502 has a relatively higher value (e.g., magnitude) than the second weighted parameter 504. Thus, there is a higher probability the network sampler 220 will generate a pseudo-random number in the interval of the first weighted parameter 502.

While an example manner of implementing the BNN ensemble controller 214 of FIG. 2 is illustrated in FIG. 2, one or more of the elements, processes and/or devices illustrated in FIG. 2 may be combined, divided, re-arranged, omitted, eliminated and/or implemented in any other way. Further, the example weight determiner 216, the example sample controller 218, the example network sampler 220, the example inference controller 222, the example uncertainty estimator 224, the example model database 226 and/or, more generally, the example BNN ensemble controller 214 of FIG. 2 may be implemented by hardware, software, firmware and/or any combination of hardware, software and/or firmware. Thus, for example, any of the example weight determiner 216, the example sample controller 218, the example network sampler 220, the example inference controller 222, the example uncertainty estimator 224, the example model database 226 and/or, more generally, the example BNN ensemble controller 214 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example weight determiner 216, the example sample controller 218, the example network sampler 220, the example inference controller 222, the example uncertainty estimator 224, the example model database 226 is/are hereby expressly defined to include a non-transitory computer readable storage device or storage disk such as a memory, a digital versatile disk (DVD), a compact disk (CD), a Blu-ray disk, etc. including the software and/or firmware. Further still, the example BNN ensemble controller 214 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the BNN ensemble controller 214 of FIG. 2 is shown in FIG. 2. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example BNN ensemble controller 214 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
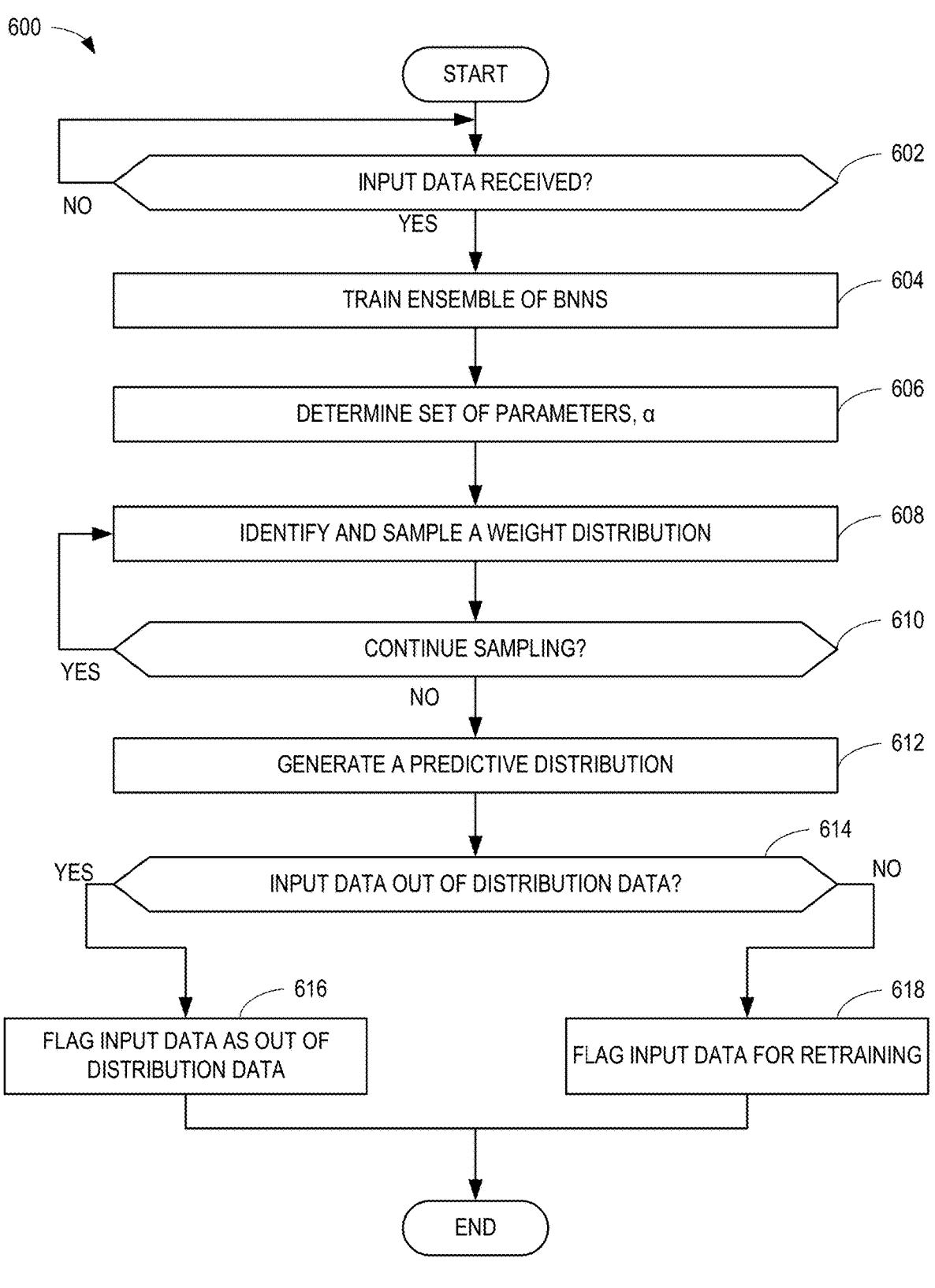
FIG. 6 is a flowchart representative of example machine readable instructions which may be executed to implement the example BNN ensemble controller of FIG. 2.

FIG. 6 is a flowchart representative of example machine-readable instructions 600 that may be executed to implement the example BNN ensemble controller 214 of FIG. 2 to detect OOD data. The example machine-readable instructions of FIG. 6 begin at block 602 at which the example NN trainer 102 (FIG. 1) determines if input data was received. For example, the NN trainer 102 determines if training data (e.g., image frames, etc.) was received. If the example NN trainer 102 determines input data was not received (e.g., block 602 returns a result of NO), instructions return to block 602. If the example NN trainer 102 determines that input data was received (e.g., block 602 returns a result of YES), the example NN trainer 102 trains an ensemble of BNNs. (Block 604). For example, the NN trainer 102 trains the first BNN system 202 (FIG. 2) of the ensemble with the first subset of data 210 (FIG. 2), trains the second BNN system 204 (FIG. 2) of the ensemble with the second subset of data 212 (FIG. 2), etc.

The example weight determiner 216 (FIG. 2) determines a set of parameters, $\alpha$. (Block 606). For example, the weight determiner 216 determines a proportion (e.g., $\beta_j$) of the samples of a class j in the input data, the number of networks (e.g., $N_j$) in the ensemble of BNNs that recognize the class j, and a set of class labels (e.g., $L_j$) that have been assigned to a network i of the ensemble. In some examples, the example weight determiner 216 determines the set of parameters using example Equation 3 for each of the BNNs (e.g., $\alpha_i$).

The example network sampler 220 (FIG. 2) identifies and samples a weight distribution. (Block 608). For example, the network sampler 220 generates a pseudo-random number in the interval 0 to 1. The network sampler 220 samples the weight distribution of the BNN corresponding to the pseudo-random number (e.g., based on the set of parameters, $\alpha_i$).

The example sample controller 218 (FIG. 2) determines whether to continue sampling the weight distributions of the ensemble of BNNs. (Block 610). For example, the sample controller 218 determines to continue sampling the weight distribution of the ensemble of BNNs if the number of samples collected is less than a threshold number of samples. Additionally or alternatively, the sample controller 218 determines to continue sampling the weight distribution of the ensemble of BNNs if the uncertainty of the ensemble of BNNs is less than a threshold uncertainty.

If the sample controller 218 determines to continue sampling the ensemble of BNNs (e.g., block 610 returns a result of YES), the instructions return to block 608. If the sample controller 218 determines to not continue sampling the ensemble of BNNs (e.g., block 610 returns a result of NO), the inference controller 222 (FIG. 2) generates a predictive weight distribution. (Block 612). For example, the inference controller 222 aggregates the samples and uses a GMM to mix the samples to determine a predictive weight distribution of the ensemble of BNNs. In some examples, the inference controller 222 stores the predictive distribution in the model database 226 (FIG. 2).

The example uncertainty estimator 224 (FIG. 2) determines whether the input data is out of distribution data. (Block 614). For example, the uncertainty estimator 224 determines the epistemic uncertainty of the predictive distribution. In some examples, the uncertainty estimator 224 determines the input data is OOD data if the epistemic uncertainty is above an uncertainty threshold. If the uncertainty estimator 224 determines the input data is OOD data (e.g., block 614 returns a result of YES), the uncertainty estimator 224 flags the input data as OOD data. (Block 616). For example, the BNN ensemble controller 214 may discard the input data in response to an OOD data flag. If the uncertainty estimator 224 determines the input data is not OOD data (e.g., block 614 returns a result of NO), the uncertainty estimator 224 flags the input data for retraining. (Block 618). For example, the NN trainer 102 may retrain the first BNN system 202 and/or the second BNN system 204 in response to the retraining flag, enabling continuous learning.

Figure 7:
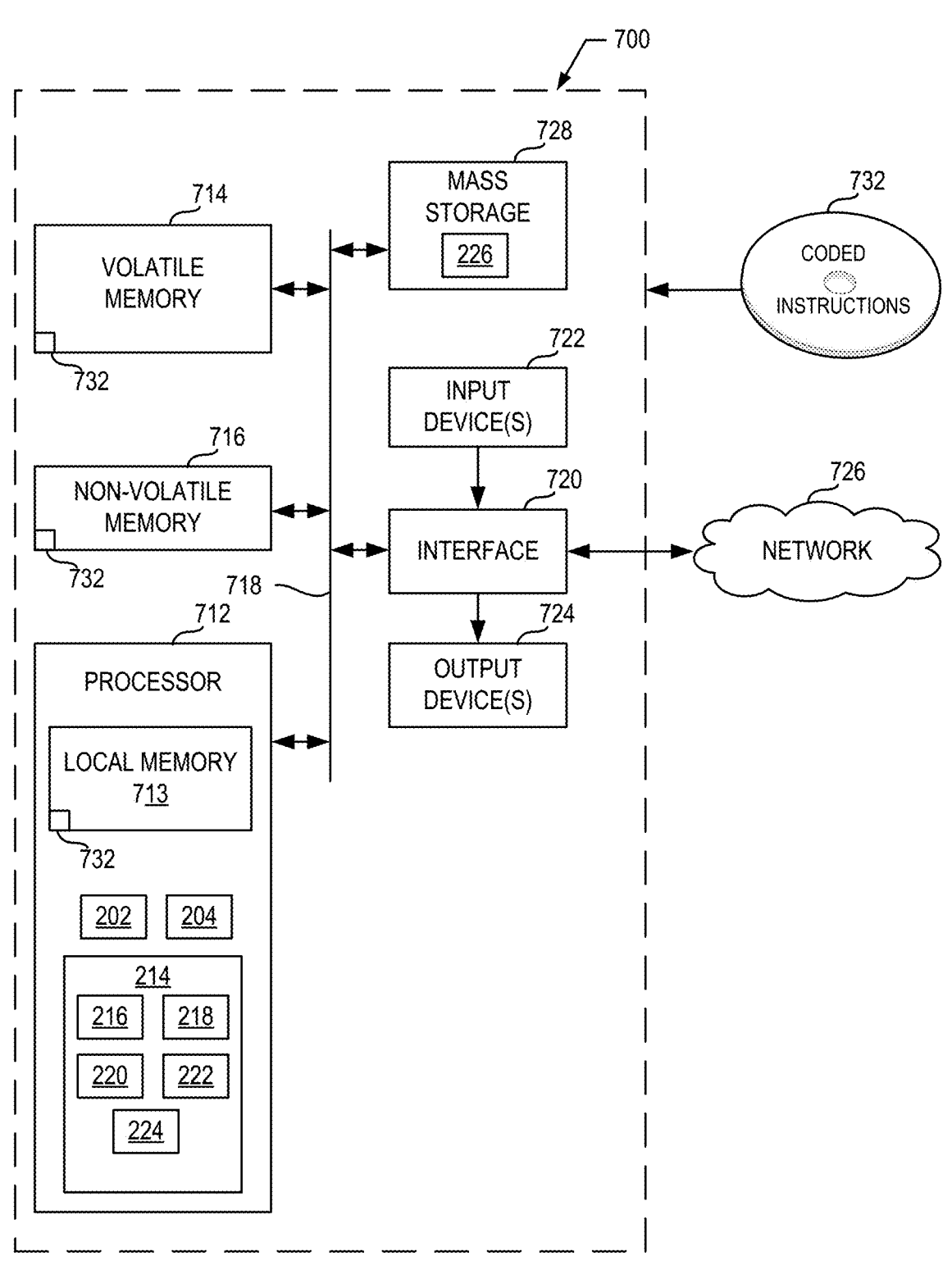
FIG. 7 is a block diagram of an example processing platform structured to execute the instructions of FIG. 6 to implement the example BNN ensemble controller of FIG. 2.

FIG. 7 is a block diagram of an example processor platform 700 structured to execute the instructions of FIG. 6 to implement the BNN ensemble controller 214 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example weight determiner 216, the example sample controller 218, the example network sampler 220, the example inference controller 222, and the example uncertainty estimator 224.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

Figure 8:
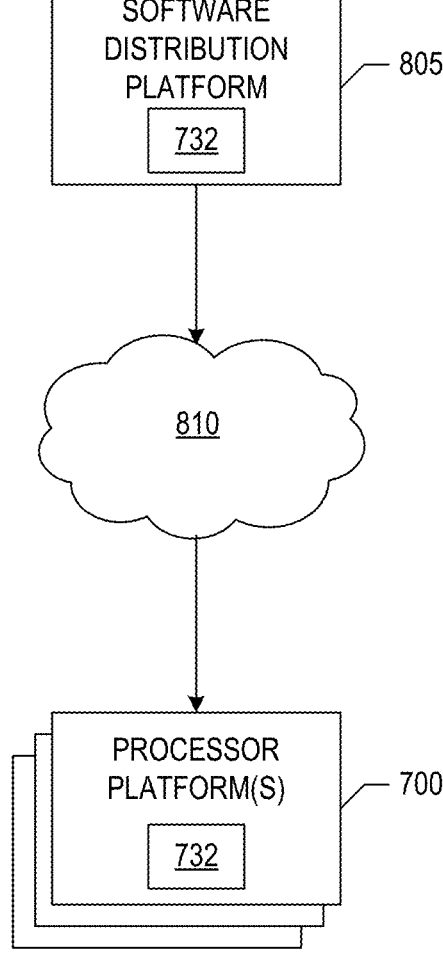
FIG. 8 is a block diagram of an example software distribution platform to distribute software (e.g., software corresponding to the example computer readable instructions of FIG. 6) to client devices.

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers (e.g., for license, sale and/or use), users, retailers (e.g., for sale, re-sale, license, and/or sub-license), original equipment manufacturers (OEMs) (e.g., for inclusion in products to be distributed to, for example, retailers and/or to direct buy customers), etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example computer readable instructions 600 of FIG. 6, as described above. The one or more servers of the example software distribution platform 805 are in communication with a network 810, which may correspond to any one or more of the Internet and/or any of the example networks 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions 732 of FIG. 7, may be downloaded to the example processor platform 700, which is to execute the computer readable instructions 732 to implement the example BNN ensemble controller 214. In some example, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

From the foregoing, it will be appreciated that example methods, apparatus and articles of manufacture have been disclosed that facilitate continuous learning among neural networks. For example, a BNN ensemble controller trains an ensemble of BNNs and samples the weight distributions of the ensemble to generate a predictive distribution. The BNN ensemble controller determines the epistemic uncertainty of the predictive distribution to detect OOD data. The disclosed methods, apparatus and articles of manufacture improve the efficiency of using a computing device by reducing memory and computing time by adjusting the sampling of the weight distributions. Additionally or alternatively, the disclosed methods, apparatus and articles of manufacture improve the efficiency of using a computing device by identifying and removing OOD data and, thus, increase the accuracy of continuous learning. The disclosed methods, apparatus and articles of manufacture are accordingly directed to one or more improvement(s) in the functioning of a computer.

Example methods, apparatus, systems, and articles of manufacture to facilitate continuous learning are disclosed herein. Further examples and combinations thereof include the following:

Example 1 includes an apparatus, comprising a trainer to train a first Bayesian neural network (BNN) and a second BNN, the first BNN associated with a first weight distribution and the second BNN associated with a second weight distribution, a weight determiner to determine a first sampling weight associated with the first BNN and a second sampling weight associated with the second BNN, a network sampler to sample at least one of the first weight distribution or the second weight distribution based on a pseudo-random number, the first sampling weight, and the second sampling weight, and an inference controller to generate an ensemble weight distribution based on the sample.

Example 2 includes the apparatus of example 1, wherein the first BNN is a unimodal Gaussian model and the second BNN is a unimodal Gaussian model.

Example 3 includes the apparatus of example 1, wherein the first BNN and the second BNN form an ensemble of BNNs.

Example 4 includes the apparatus of example 3, wherein the ensemble of BNNs is a Gaussian Mixture Model (GMM).

Example 5 includes the apparatus of example 1, wherein the trainer is to train the first BNN and the second BNN on a training dataset.

Example 6 includes the apparatus of example 1, wherein the trainer is to train the first BNN on a first subset of a training dataset and the second BNN on a second subset of the training dataset.

Example 7 includes the apparatus of example 1, wherein the first sampling weight and the second sampling weight sum to 1.

Example 8 includes the apparatus of example 1, wherein the weight determiner is to determine the first sampling weight and the second sampling weight based on a proportion of samples of a class and a number of networks of the class.

Example 9 includes the apparatus of example 1, further including an uncertainty estimator to determine an uncertainty of the ensemble weight distribution, the uncertainty including an aleatoric uncertainty and an epistemic uncertainty.

Example 10 includes the apparatus of example 9, wherein the uncertainty estimator is to identify out of distribution data based on the epistemic uncertainty.

Example 11 includes at least one non-transitory computer readable medium comprising instructions that, when executed, cause at least one processor to at least train a first Bayesian neural network (BNN) and a second BNN, the first BNN associated with a first weight distribution and the second BNN associated with a second weight distribution, determine a first sampling weight associated with the first BNN and a second sampling weight associated with the second BNN, sample at least one of the first weight distribution or the second weight distribution based on a pseudo-random number, the first sampling weight, and the second sampling weight, and generate an ensemble weight distribution based on the sample.

Example 12 includes the at least one non-transitory computer readable medium of example 11, wherein the first BNN is a unimodal Gaussian model and the second BNN is a unimodal Gaussian model.

Example 13 includes the at least one non-transitory computer readable medium of example 11, wherein the first BNN and the second BNN form an ensemble of BNNs.

Example 14 includes the at least one non-transitory computer readable medium of example 13, wherein the ensemble of BNNs is a Gaussian Mixture Model (GMM).

Example 15 includes the at least one non-transitory computer readable medium of example 11, wherein the instructions, when executed, cause the at least one processor to train the first BNN and the second BNN on a training dataset.

Example 16 includes the at least one non-transitory computer readable medium of example 11, wherein the instructions, when executed, cause the at least one processor to train the first BNN on a first subset of a training dataset and the second BNN on a second subset of the training dataset.

Example 17 includes the at least one non-transitory computer readable medium of example 11, wherein the first sampling weight and the second sampling weight sum to 1.

Example 18 includes the at least one non-transitory computer readable medium of example 11, wherein the instructions, when executed, cause the at least one processor to determine the first sampling weight and the second sampling weight based on a proportion of samples of a class and a number of networks of the class.

Example 19 includes the at least one non-transitory computer readable medium of example 11, wherein the instructions, when executed, cause the at least one processor to determine an uncertainty of the ensemble weight distribution, the uncertainty including an aleatoric uncertainty and an epistemic uncertainty.

Example 20 includes the at least one non-transitory computer readable medium of example 19, wherein the instructions, when executed, cause the at least one processor to identify out of distribution data based on the epistemic uncertainty.

Example 21 includes an apparatus, comprising memory, and at least one processor to execute machine readable instructions to train a first Bayesian neural network (BNN) and a second BNN, the first BNN associated with a first weight distribution and the second BNN associated with a second weight distribution, determine a first sampling weight associated with the first BNN and a second sampling weight associated with the second BNN, sample at least one of the first weight distribution or the second weight distribution based on a pseudo-random number, the first sampling weight, and the second sampling weight, and generate an ensemble weight distribution based on the sample.

Example 22 includes the apparatus of example 21, wherein the first BNN is a unimodal Gaussian model and the second BNN is a unimodal Gaussian model.

Example 23 includes the apparatus of example 21, wherein the first BNN and the second BNN form an ensemble of BNNs.

Example 24 includes the apparatus of example 23, wherein the ensemble of BNNs is a Gaussian Mixture Model (GMM).

Example 25 includes the apparatus of example 21, wherein the at least one processor is to train the first BNN and the second BNN on a training dataset.

Example 26 includes the apparatus of example 21, wherein the at least one processor is to train the first BNN on a first subset of a training dataset and the second BNN on a second subset of the training dataset.

Example 27 includes the apparatus of example 21, wherein the first sampling weight and the second sampling weight sum to 1.

Example 28 includes the apparatus of example 21, wherein the at least one processor is to determine the first sampling weight and the second sampling weight based on a proportion of samples of a class and a number of networks of the class.

Example 29 includes the apparatus of example 21, wherein the at least one processor is to determine an uncertainty of the ensemble weight distribution, the uncertainty including an aleatoric uncertainty and an epistemic uncertainty.

Example 30 includes the apparatus of example 29, wherein the at least one processor is to identify out of distribution data based on the epistemic uncertainty.

Example 31 includes a method, comprising training a first Bayesian neural network (BNN) and a second BNN, the first BNN associated with a first weight distribution and the second BNN associated with a second weight distribution, determining a first sampling weight associated with the first BNN and a second sampling weight associated with the second BNN, sampling at least one of the first weight distribution or the second weight distribution based on a pseudo-random number, the first sampling weight, and the second sampling weight, and generating an ensemble weight distribution based on the sample.

Example 32 includes the method of example 31, wherein the first BNN is a unimodal Gaussian model and the second BNN is a unimodal Gaussian model.

Example 33 includes the method of example 31, wherein the first BNN and the second BNN form an ensemble of BNNs.

Example 34 includes the method of example 33, wherein the ensemble of BNNs is a Gaussian Mixture Model (GMM).

Example 35 includes the method of example 31, further including training the first BNN and the second BNN on a training dataset.

Example 36 includes the method of example 31, further including training the first BNN on a first subset of a training dataset and the second BNN on a second subset of the training dataset.

Example 37 includes the method of example 31, wherein the first sampling weight and the second sampling weight sum to 1.

Example 38 includes the method of example 31, further including determining the first sampling weight and the second sampling weight based on a proportion of samples of a class and a number of networks of the class.

Example 39 includes the method of example 31, further including determining an uncertainty of the ensemble weight distribution, the uncertainty including an aleatoric uncertainty and an epistemic uncertainty.

Example 40 includes the method of example 39, further including identifying out of distribution data based on the epistemic uncertainty.

Example 41 includes an apparatus, comprising means for training to train a first Bayesian neural network (BNN) and a second BNN, the first BNN associated with a first weight distribution and the second BNN associated with a second weight distribution, means for determining weights to determine a first sampling weight associated with the first BNN and a second sampling weight associated with the second BNN, means for sampling to sample at least one of the first weight distribution or the second weight distribution based on a pseudo-random number, the first sampling weight, and the second sampling weight, and means for inferring to generate an ensemble weight distribution based on the sample.

Example 42 includes the apparatus of example 41, wherein the first BNN is a unimodal Gaussian model and the second BNN is a unimodal Gaussian model.

Example 43 includes the apparatus of example 41, wherein the first BNN and the second BNN form an ensemble of BNNs.

Example 44 includes the apparatus of example 43, wherein the ensemble of BNNs is a Gaussian Mixture Model (GMM).

Example 45 includes the apparatus of example 41, wherein the means for training is to train the first BNN and the second BNN on a training dataset.

Example 46 includes the apparatus of example 41, wherein the means for training is to train the first BNN on a first subset of a training dataset and the second BNN on a second subset of the training dataset.

Example 47 includes the apparatus of example 41, wherein the first sampling weight and the second sampling weight sum to 1.

Example 48 includes the apparatus of example 41, wherein the means for determining weights is to determine the first sampling weight and the second sampling weight based on a proportion of samples of a class and a number of networks of the class.

Example 49 includes the apparatus of example 41, further including means for estimating uncertainty to determine an uncertainty of the ensemble weight distribution, the uncertainty including an aleatoric uncertainty and an epistemic uncertainty.

Example 50 includes the apparatus of example 49, wherein the means for estimating uncertainty is to identify out of distribution data based on the epistemic uncertainty.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
interface circuitry;
machine readable instructions; and
programmable circuitry to at least one of instantiate or execute the machine readable instructions to:
train a first Bayesian neural network (BNN) using initial training data, the first BNN associated with a first weight distribution;
in response to obtaining additional training data, train a second BNN using the initial training data and the additional training data, the second BNN associated with a second weight distribution, wherein the first weight distribution and the second weight distribution are unimodal multivariate Gaussian distributions having respective means and standard deviations;
determine a first sampling weight associated with the first BNN and a second sampling weight associated with the second BNN;
sample a Gaussian distribution of at least one of the first weight distribution or the second weight distribution based on a pseudo-random number, the first sampling weight, and the second sampling weight;
generate a Gaussian mixture model ensemble weight distribution based on the sample, the Gaussian mixture model ensemble weight distribution being part of an ensemble BNN system that includes the first BNN and the second BNN, the ensemble BNN system being less susceptible to catastrophic forgetting than the second BNN; and
cause training of a third BNN based on the Gaussian mixture model ensemble weight distribution.

2. The apparatus of claim 1, wherein the programmable circuitry is to train the first BNN and the second BNN on a training dataset.

3. The apparatus of claim 1, wherein the programmable circuitry is to train the first BNN on a first subset of a training dataset and the second BNN on a second subset of the training dataset.

4. The apparatus of claim 1, wherein the first sampling weight and the second sampling weight sum to 1.

5. The apparatus of claim 1, wherein the instructions cause the programmable circuitry to determine the first sampling weight and the second sampling weight based on a proportion of samples of a class and a number of networks of the class.

6. The apparatus of claim 1, wherein the programmable circuitry is to determine an uncertainty of the Gaussian mixture model ensemble weight distribution, the uncertainty including an aleatoric uncertainty and an epistemic uncertainty.

7. The apparatus of claim 6, wherein the programmable circuitry is to identify out of distribution data based on the epistemic uncertainty.

8. The apparatus of claim 1, wherein the programmable circuitry is to:

continue, in response to a determination that an uncertainty of the Gaussian mixture model ensemble weight distribution is less than a threshold uncertainty, to sample the at least one of the first weight distribution or the second weight distribution; and generate, in response to a determination that the uncertainty of the Gaussian mixture model ensemble weight distribution is greater or equal to the threshold uncertainty, a predictive distribution based on the samples.

9. At least one non-transitory computer readable medium comprising instructions that, when executed, cause at least one processor to at least:

train a first Bayesian neural network (BNN) using initial training data, the first BNN associated with a first weight distribution;

in response to obtaining additional training data, train a second BNN using the initial training data and the additional training data, the second BNN associated with a second weight distribution, wherein the first weight distribution and the second weight distribution are unimodal multivariate Gaussian distributions having respective means and standard deviations;

determine a first sampling weight associated with the first BNN and a second sampling weight associated with the second BNN;

sample a Gaussian distribution of at least one of the first weight distribution or the second weight distribution based on a pseudo-random number, the first sampling weight, and the second sampling weight;

generate a Gaussian mixture model ensemble weight distribution based on the sample, the Gaussian mixture model ensemble weight distribution being part of an ensemble BNN system that includes the first BNN and the second BNN, the ensemble BNN system being less susceptible to catastrophic forgetting than the second BNN; and cause training of a third BNN based on the Gaussian mixture model ensemble weight distribution.

10. The at least one non-transitory computer readable medium of claim 9, wherein the instructions, when executed, cause the at least one processor to train the first BNN and the second BNN on a training dataset.

11. The at least one non-transitory computer readable medium of claim 9, wherein the instructions, when executed, cause the at least one processor to train the first BNN on a first subset of a training dataset and the second BNN on a second subset of the training dataset.

12. The at least one non-transitory computer readable medium of claim 9, wherein the first sampling weight and the second sampling weight sum to 1.

13. The at least one non-transitory computer readable medium of claim 9, wherein the instructions, when executed, cause the at least one processor to determine the first sampling weight and the second sampling weight based on a proportion of samples of a class and a number of networks of the class.

14. The at least one non-transitory computer readable medium of claim 9, wherein the instructions, when executed, cause the at least one processor to determine an uncertainty of the Gaussian mixture model ensemble weight distribution, the uncertainty including an aleatoric uncertainty and an epistemic uncertainty.

15. The at least one non-transitory computer readable medium of claim 14, wherein the instructions, when executed, cause the at least one processor to identify out of distribution data based on the epistemic uncertainty.

16. The at least one non-transitory computer readable medium of claim 9, wherein the instructions, when executed, cause the at least one processor to:

continue, in response to a determination that an uncertainty of the Gaussian mixture model ensemble weight distribution is less than a threshold uncertainty, to sample the at least one of the first weight distribution or the second weight distribution; and generate, in response to a determination that the uncertainty of the Gaussian mixture model ensemble weight distribution is greater or equal to the threshold uncertainty, a predictive distribution based on the samples.

17. An apparatus, comprising:

memory; and at least one processor to execute machine readable instructions to:

train a first Bayesian neural network (BNN) using initial training data, the first BNN associated with a first weight distribution;

in response to obtaining additional training data, train a second BNN using the initial training data and the additional training data, the second BNN associated with a second weight distribution, wherein the first weight distribution and the second weight distribution are unimodal multivariate Gaussian distributions having respective means and standard deviations;

determine a first sampling weight associated with the first BNN and a second sampling weight associated with the second BNN;

sample at least one of the first weight distribution or the second weight distribution based on a pseudo-random number, the first sampling weight, and the second sampling weight;

generate a Gaussian mixture model ensemble weight distribution based on the sample, the Gaussian mixture model ensemble weight distribution being part of an ensemble BNN system that includes the first BNN and the second BNN, the ensemble BNN system being less susceptible to catastrophic forgetting than the second BNN; and cause training of a third BNN based on the Gaussian mixture model ensemble weight distribution.

18. The apparatus of claim 17, wherein the at least one processor is to train the first BNN and the second BNN on a training dataset.

19. The apparatus of claim 17, wherein the at least one processor is to:

continue, in response to a determination that an uncertainty of the Gaussian mixture model ensemble weight distribution is less than a threshold uncertainty, sampling the at least one of the first weight distribution or the second weight distribution; and generate, in response to a determination that the uncertainty of the Gaussian mixture model ensemble weight distribution is greater or equal to the threshold uncertainty, a predictive distribution based on the samples.

* * * * *